United States Patent [19]
Georges

[11] 3,879,863
[45]*Apr. 29, 1975

[54] EXAMINATION PAPER SCORING ASSEMBLY

[76] Inventor: Michael P. Georges, P.O. Box 800, Norwood, Mass. 02062

[ * ] Notice: The portion of the term of this patent subsequent to Mar. 26, 1990, has been disclaimed.

[22] Filed: Dec. 20, 1972

[21] Appl. No.: 316,761

Related U.S. Application Data

[62] Division of Ser. No. 47,264, June 18, 1970, Pat. No. 3,722,111.

[52] U.S. Cl........ 35/48 B; 235/61.6 E; 235/61.11 E
[51] Int. Cl........................... G09b 5/00; G09b 7/00
[58] Field of Search.... 235/61.6 E, 61.11 E, 61.7 R, 235/61.9 R; 35/48 B

[56] References Cited
UNITED STATES PATENTS 3,216,132  11/1965  Flaherty et al............... 235/61.11 E
3,722,111  3/1973  Georges.............................. 35/48 B

*Primary Examiner*—Thomas J. Sloyan
*Attorney, Agent, or Firm*—Dike, Bronstein, Roberts, Cushman & Pfund

[57] ABSTRACT

The Examination Paper Test Score System provides for registry of a multiple column test answer sheet containing multiple-choice answer blocks with a light permeable predetermined pattern representing answer response positions. A test bed transports the registered master answer-aperture plate and test sheet past a scan line of photo detector devices which register the student's score as the number of light transmissive areas contained in each row and each row consisting of a plurality of blocks from adjacent columns is read by scanning at a sensor row as the aligned sheets pass thereacross. The apertures in the test sheet and the master answer-aperture plate are related to provide a constant transmission aperture area with a substantial misalignment tolerance.

1 Claim, 6 Drawing Figures

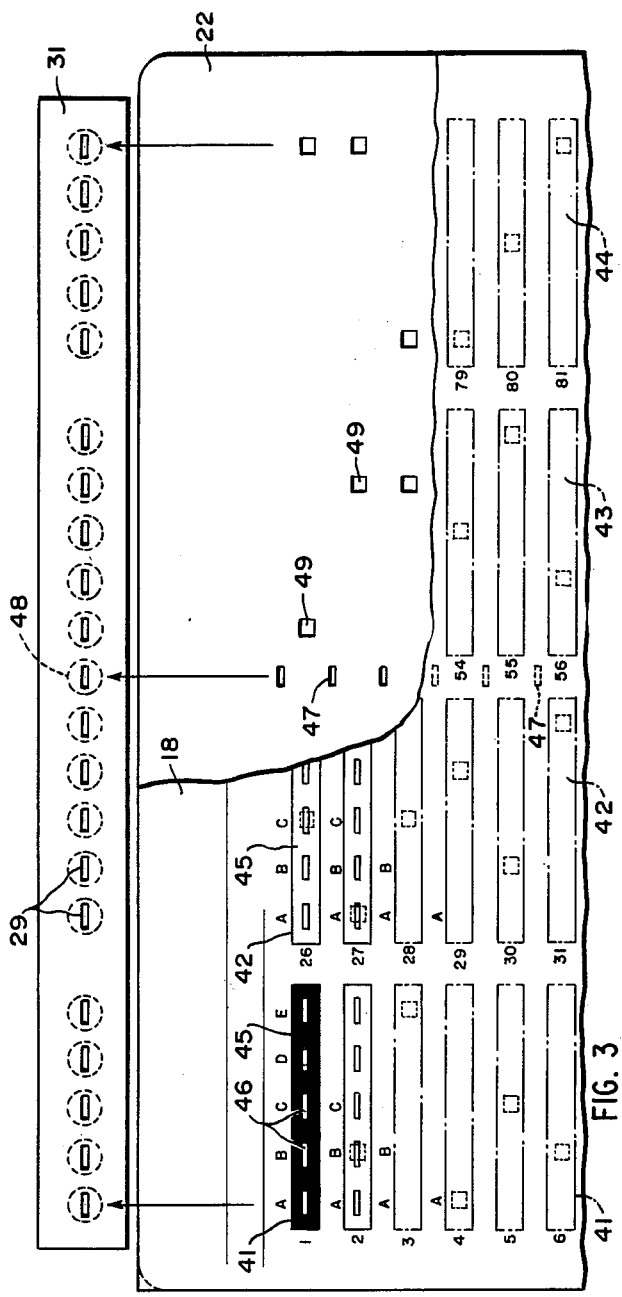
FIG. 3
FIG. 4
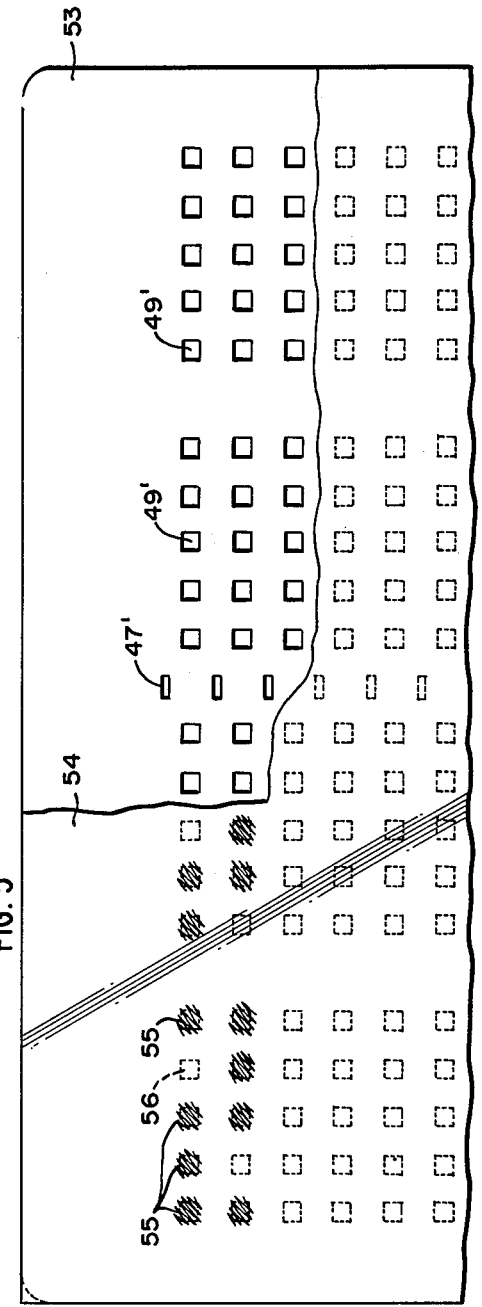
FIG. 5

EXAMINATION PAPER SCORING ASSEMBLY

RELATED APPLICATION

This application is a division of my copending application Ser. No. 47,264, filed June 18, 1970, now U.S. Pat. No. 3,722,111.

BACKGROUND OF THE INVENTION

This invention relates to electronic examination paper test scoring devices of the type wherein the examination is multiple-choice type and the test score is obtained by comparing the pattern of multiple-choice answers selected and placed by the student onto a test answer sheet with the correct answer pattern contained in a master answer device. Devices for grading papers based on this general arrangement are well known and range from the large automatic machines for grading large numbers of examination papers at high speed, such as the device described in U.S. Pat. No. 3,050,248, to various smaller machines adapted for use in the individual classroom wherein the examination papers are manually fed through the grading station.

The present invention relates to the smaller type machine that preferably uses conventional 8½ × 11 inch size test answer sheets and is adapted for use in the individual classroom or in a central office of a smaller school with the operation being convenient mechanically and yet rapid and reliable so as to permit the individual teachers to grade the papers for a day's examination of all his students in a very brief period of time, while at the same time providing economy and reliability which is necessary to encourage the widespread adoption of such a device in smaller school entities. At the same time the invention provides for the use of marks that the reasonably small in size and which have a desired shape of being relatively long and narrow for easy application by the student and also a high density examination paper permitting a large number of examination questions to be answered on a single sheet with a full format of five multiple choice answer response positions for each question. The answer mark to be placed on the test answer sheet is to be opaque to transmitted light and can be applied conveniently with a conventional writing instrument such as a No. 2 pencil. High density markings are possible in the examination paper because: (1.) In the horizontal direction the simplicity and economy of the electronic circuits makes it economically feasible to have a full complement of 4 columns of 5 response position groups (20 photodetector positions) across the examination paper. (2.) In both the vertical and horizontal directions the total or cooperating masking technique used between holes and hole locations effectively reduces light interference or leakage between adjacent response positions and also in relation to the scanning control photo detector.

In the preferred form the examination paper and the scoring sensors are laid out in strictly rectilinear fashion so that there is no unusual configuration of the sheet as far as offsetting columns of answers or of the detectors for the various columns thereby eliminating the necessity for an abnormal marking pattern as is the case where staggered rows of answer columns are used. Further, the preferred form uses a set of photo detector devices having a latching characteristic and is employed so that plural columns of questions containing multiple answers in each row are detected simultaneously as the row passes beneath the sensor row and by means of an electronic scan the incorrect and omitted answers are read from the scanned row during the interval when the next row of answers is moving to the sensor position. The speed of operation of the device is such that a simple in and out movement of the answer sheet past the sensor row accomplishes a complete page scan and answer totalizing thereby giving the teacher the results of an individual paper with extreme speed and simplicity of operation.

The examination paper or test answer sheet fill-in-blocks give a better defined area for the student to place his response mark. He is able readily to determine when he has properly completed the marking task. This makes for greater machine reliability in reading the student marks or responses. Also the isolated individual answer or response blocks on the test sheet and the isolated 4 columns of these answer blocks allow the student quicker and more accurate test answer response position placement and quicker and more accurate answer number locating than on test sheets where distinct groupings or contrast isolation is not present. Thus the mechanics of taking a multiple-choice test will be less tiring and the responding to the answers can be done faster and with fewer errors than those that are made due to losing ones place.

The object of the invention therefore is to provide a high density examination paper using small response marks and that is easy and convenient for the student to use, which is graded in a grading machine which accommodates the same thereby providing a multiple-choice examination paper grading system which permits more examination questions to be answered in a conventional size, for example, 8½ × 11 inch test paper than has heretofore been possible in a small low cost system. The optics of the apertures in the system are so arranged that extremely high accuracy of grading is obtained with a considerable tolerance latitude permitted in the physical alignment of the parts. Thus the unit is well adapted for use by the everyday teacher at the end of the class period who can operate the device with confidence although they do not possess any particular skill in aligning and feeding the examination papers through the device.

IN THE DRAWINGS

FIG. 3 is a plan view of examination paper with a permanent master answer-aperture plate shown in design center line relation to the sensor row of the grading machine.

FIG. 4 is an enlarged view of the design center relation of the apertures in the aperture plate and examination paper sheet.

FIG. 5 is another preferred form of answer device comprising an aperture plate with a full aperture array and a light transmissive overlay sheet portions of which have been rendered opaque.

DESCRIPTION OF THE PREFERRED EMBODIMENTS

Figure 1:
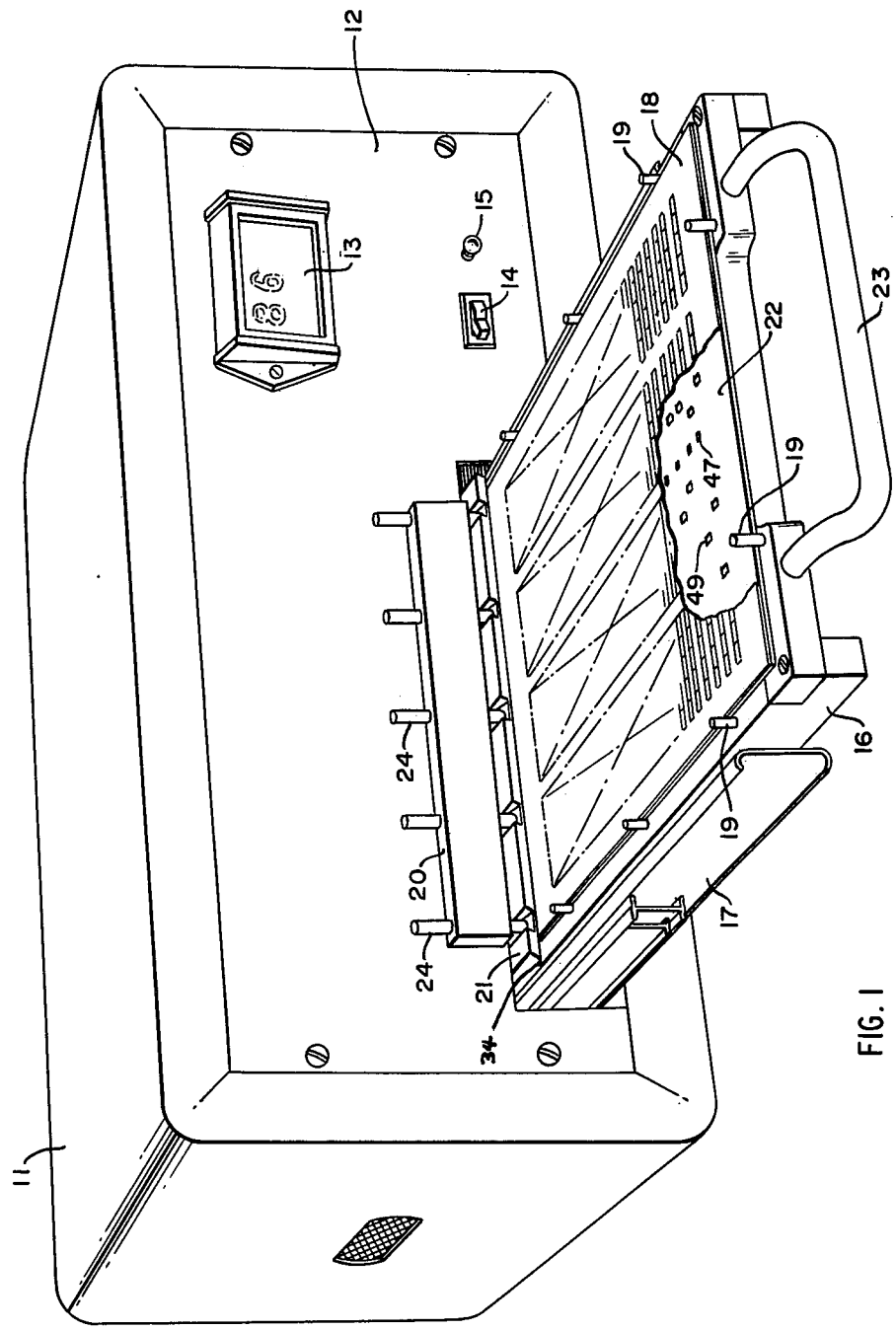
FIG. 1 is a perspective view of one preferred arrangement of the paper grading machine with an examination paper and a permanent master answer-aperture plate shown in place for operation.

The invention comprises a housing 11 having a front panel 12, upon which a numerical indicator 13 is supported. The indicator 13 provides a readout of the test score and may conveniently consist of a window through which numerals of a pair of electronic indicator tubes appear. Also mounted on the panel are on-off switch 14 and pilot light 15.

The front panel contains a sliding support bed or carriage 16 which is mounted on a conventional drawer extension slide assembly 17 so as to permit the support bed 16 to be fully extended as shown to receive an examination paper or test answer sheet 18 thereon. The examination paper is positioned by a series of pins 19 and a paper stop in the form of an elongated slotted bar 21. The examination paper 18 rests upon and is supported by a rigid master answer-aperture plate 22. The answer-aperture plate 22 is mounted on the support bed frame 16 and aligned properly within the positioning boundaries 19 and 21 on the support bed frame 16 and is opaque except for the apertures 49 and 47. Alternatively, a transparent support plate could be used covered by an opaque surface with the appropriate aperture pattern. Thus with the answer-aperture plate 22 aligned with and the examination paper 18 in place between the positioning posts 19 and the edge of the paper positioning bar 21 assures that the aperture plate 22 and examination paper 18 are in appropriate registry in relation to the design centers and as will hereinafter appear provides sufficiently accurate registration to assure uniform light detection properties during the sensing operation.

The support bed 16 is capable of being slid into the housing 11 on the extension slide assembly 17 by holding the handle 23 and the procedure for grading a paper is to place the examination paper 18 on answer-aperture plate 22 as shown in FIG. 1, pushing the support bed or carriage 16 completely into the housing 11, and withdrawing it again to the position shown in FIG. 1. In doing this operation the examination paper is graded and the correct test score appears at the indicator window 13. During the scanning of the examination paper in order to maintain optical uniformity and to prevent light leakage around the examination paper apertures the examination paper 18 must be kept flat and in reasonable contact with the aperture plate 22 in the vicinity of the photo sensing area. As the sliding motion of the support bed 16 takes place a series of light weight Teflon rods 24 which are loosely supported in vertical holes in a bar 20 act as weights to hold the examination paper 18 flat against the top surface of the answer-aperture plate 22 at the photo sensing area without unduly weighting the paper or having any tendency to bind, buckle or otherwise distort the thin light transmissive sheet on which the examination paper 18 is printed.

Figure 2:
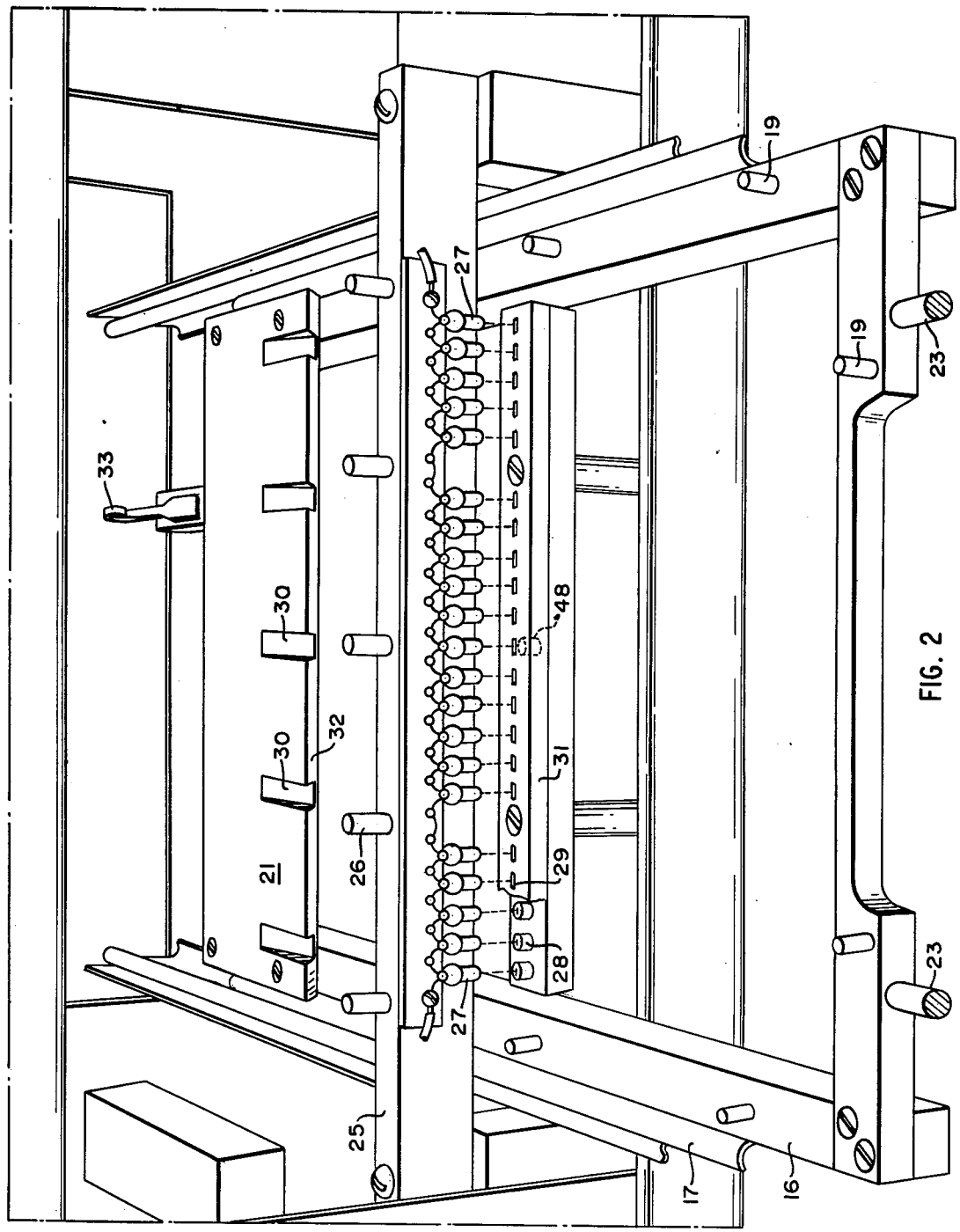
FIG. 2 is a view along the same lines as FIG. 1, with cover removed to show various internal features of the device.

Referring now to FIG. 2, the interior construction details are shown which include a second bar 25 having a series of vertical holes therein in which are loosely mounted a second series of light Teflon rods 26 fitted to act as a paper flattener in sliding contact with the surface of the examination paper 18. On the front surface of the bar 25 are mounted a plurality of lamps 27 which project a beam downwardly, the axis of which is aligned with the reception aperture of photo detector devices 28 and 48. The actual light transmission between the lamps 27 and the photo detector devices 28 and 48 is through a rectangular aperture 29 in a bar 31 which covers the photo detectors 28 and 48 throughout its length. This rectangular aperture cooperates with the predetermined shape of the apertures in examination paper 18 and aperture plate 22 to eliminate excessive light leakage between adjacent apertures in both the horizontal and vertical directions. To aid in eliminating this mis directed light leakage the top surface of the bar 31 which covers the photo detectors 28 and 48 and contains apertures 29 is placed as close as reasonable manufacturing tolerances permit to the bottom surface of the aperture plate 22. This technique masks off given areas and thereby cuts down on the light acceptance area and the light acceptance angle to the photo detector devices 28 and 48. In the view shown in FIG. 2 the bar 31 is broken away at the left hand end to disclose the general position of the photo detector devices 28. It will be noted in FIG. 2 that the paper flattening rods 26 are aligned in a row parallel and to the rear of the row of lamps 27 and by referring back to FIG. 1 it will be recognized that the row of paper flattening rods 24 is aligned on the front of the row of lamps 27. Thus the aligned lamps 27 and photo detectors 28 constitute a sensor row which is flanked on both sides by the rows of paper flattening rods 24 and 26 thereby holding the examination paper in close contact with the aperture plate 22 at the photo sensing area during the transit of the aligned examination paper and answer-aperture plate between the row of lamps 27 and the row of rectangular apertures 29.

The paper stop bar 21 is provided with a downwardly sloping edge 32 which acts to quickly lead into position and to keep the forward edge of the examination paper down in contact with the answer-aperture plate 22 along the paper stop bar edge. Other configurations for holding down the foreward edge of the examination paper may be used such as clips or, as illustrated in FIG. 1, a long horizontal slot 34 in the paper stop bar 21. The bar 21 is also provided with a plurality of sloping slots 30 which are positioned in alignment with the rods 24 and 26. The lower ends of the rods 24 and 26 have rounded ends thereby providing a cam action when engaged with the bottom surface of the slots 30 to lift the rods out of the way as the paper stop bar 21 slides underneath the bars 20 and 25 in which the rods are slidably mounted. When the support bed 16 is fully extended outside the housing 11 the rods 24 and 26 rest on the paper stop bar 21 out of the way of an examination paper 18 that is to be inserted for scoring and later removed. In order to record a score the examination paper 18 is inserted onto the support bed 16, the support bed 16 and examination paper 18 are pushed into the housing 11 to the closed and fully retracted position and then pulled out of the housing 11 into the fully extended position. As the examination paper 18 is pushed inward the rods 24 and 26 come down onto the paper to accomplish their flattening action and later retract out of the way as the examination paper is pulled out of the housing 11 for removal. As the examination paper 18 goes inward its leading edge is held down by the downwardly sloping edge 32 or by other means for accomplishing the same task so that the lower rounded ends of rods 24 and 26 can enter over the examination paper leading edge without hitting it. Other means of lowering the rods 24 and 26 onto the examination paper 18 without hitting against the examination paper leading edge and later lifting these same rods 24 and 26 off the examination paper 18 and out of the way may be used. Except for controlled exposing to light through apertures, the photo detector devices 28 and 48 must be kept covered from the lamps 27. The paper stop bar 21 acts in a light shielding function as an extension of the aperture plate 22 and keeps light emitting from the lamps 27 from projecting onto the photo detector devices 28 and 48 when the support bed 16 is fully extended out of the housing 11. At the end of the inward travel of the slides 17 the support bed 16 contacts a microswitch actuator 33 which provides a clear or reset signal to the electronic visual display devices which appear at the window 13. Thus the operation of the photo detector devices 28 during the inward travel of the support bed 16 is cleared and the examination paper is graded during the withdrawal of the support bed 16 thereby giving the final answer readout when the examination paper is once again in the position shown in FIG. 1 and ready to be removed from the answer-aperture plate 22 by the teacher.

Referring now to FIG. 3 the aligned relation of the examination paper 18, master answer-aperture plate 22 and the bar 31 containing apertures 29 is shown. The examination paper 18 illustrated is of one embodiment and consists of a conventional 8½ × 11 inch size document that contains twenty-five straight and evenly spaced horizontal rows of answer response position blocks 45 that are arranged in four equally spaced vertical columns 41, 42, 43 and 44. This arrangement of the examination paper 18 gives one hundred answer response position blocks 45 each of which contains five equally spaced light transmissive rectangular openings 46. The light transmissive opening 46 is the actual answer response position to be filled in by a student with an opaque mark made with a conventional writing instrument. The center portion of the test sheet 18 is unobstructed and light transmissive midway between the horizontal rows of blocks 45. Light transmitted through the unobstructed portion of the test sheet and its corresponding underlying rectangular aperture 47 on the aperture plate 22 is used to develop pulses which read the horizontal rows of information as the sheet is passed under the sensor row containing photo detectors 28. For this purpose a centrally although other means for obtaining these pulses may be used located photo detector 48 is provided/. One advantage of this overlay arrangement of examination paper 18 and aperture plate 22 is that other than the areas that are intended to become exposed to the photo sensors during the document mark sensing operation, the examination paper 18 is immune to stray or extraneous student markings that on a reflective light reading system could cause wrong readings.

As indicated in FIG. 3 by the broken away portion of the examination page 18, the master answer-aperture plate 22 comprises a predetermined pattern of approximately or relatively square apertures 49 which represent the correct answers of the examination. Rectangular apertures 46 are normally positioned (i.e., design center positions) central with respect to the approximately square apertures 49 in a manner illustrated in FIG. 4 where the width dimensions of the slot 46 indicated at 51 extend beyond the corresponding edges of the approximately square aperture 49 by an amount of overlap on each side that is substantially equal to or greater than the expected maximum possible overall misalignment from the design center position and wherein the upper and lower edges 52 of aperture 49 extends above and below the corresponding top and bottom edges 50 of the rectangular apertures 46 by an amount of overlap on the top and on the bottom that is substantially equal to or greater than the expected maximum possible overall misalignment from the design center position. This overlay arrangement of apertures will permit the use of response marks on the test answer sheet 18 that are reasonably small in size and which have a preferred shape that is relatively long and narrow. Also with this alignment of dissimilar apertures considerable movement of rectantular aperture 46 in both the horizontal and vertical direction with respect to approximately square aperture 49 is possible without changing the size or positional alignment of the resultant light transmissive area of the aligned apertures. Thus a small response mark is used and the light energy reaching the photo detectors 28 is not influenced by misalignment due to manufacturing and printing tolerance variations as the teacher inserts the individual examination paper for grading.

FIG. 5 shows an alternate form of master examination answer device comprising a rigid aperture plate 53 having therein a full array of approximately square holes 49' one for each position of the corresponding holes 46 in the examination paper. The light pulse generator holes 47' are also centrally located on the aperture plate 53. Over this aperture plate a clear Mylar or other transparent or translucent sheet 54 is laid and the instructor prepares the sheet 54 by rendering opaque certain portions 55 representing the four incorrect choices of a five-part multiple-choice answer. In this fashion the rigid plate 53 with a full array of apertures 49' is converted into a predetermined pattern of light transmissive apertures 56 made up by preparing light blocking portions 55 on the light transmissive sheet overlay 54. With this arrangement the teacher can prepare different answer locations for an examination or prepare an examination without regard to the location of the correct answer response position and prepare the overlay sheet 54 accordingly.

Figure 6:
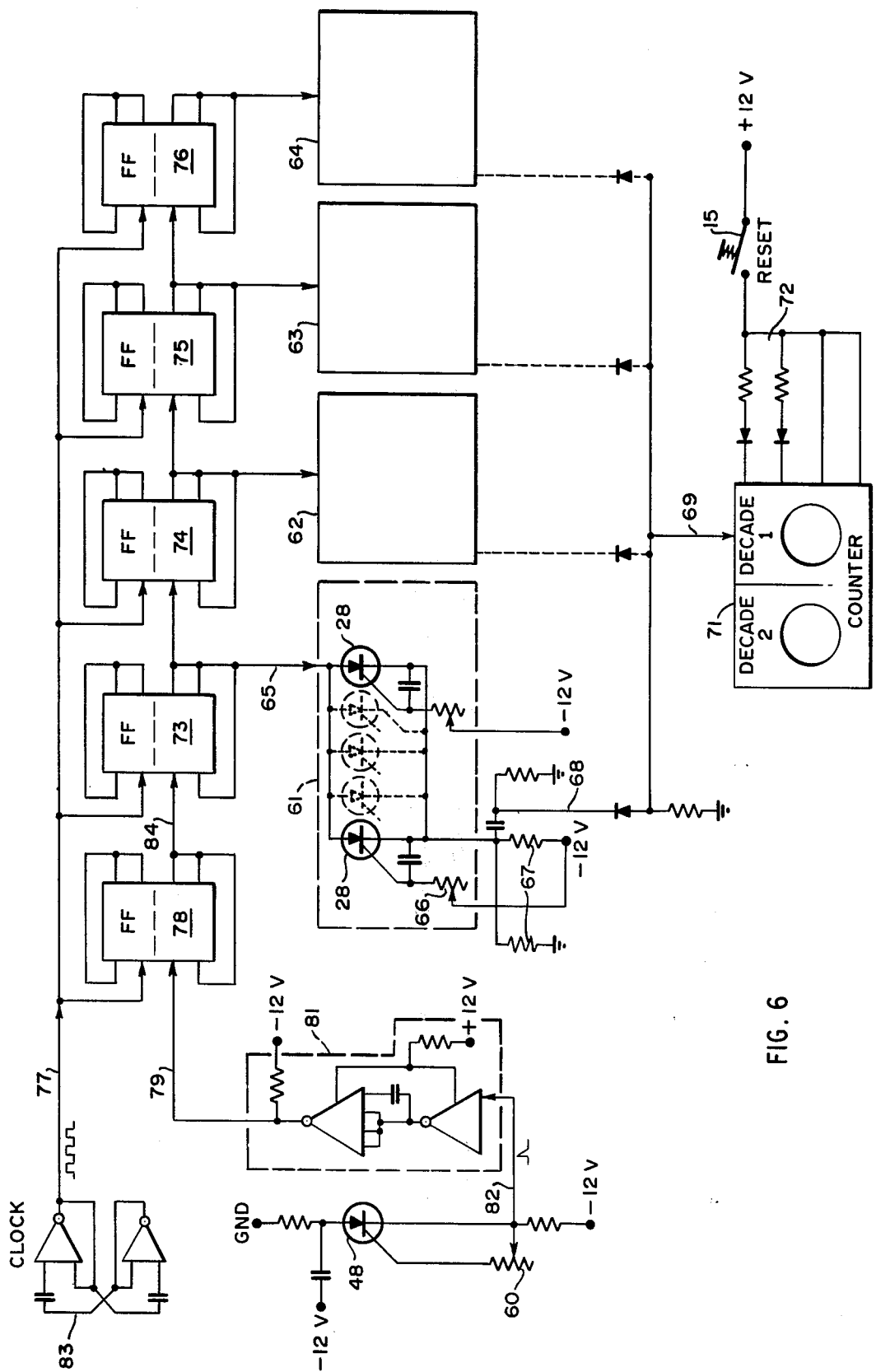
FIG. 6 is a schematic wiring diagram partly in block form of the circuit of the invention.

Referring now to FIG. 6 the electronic grading circuit of the invention will be described. In the circuit of FIG. 6 the photo detectors 28 are arranged in groups of five and there are four such groups 61, 62, 63 and 64 corresponding to the four columns 41, 42, 43 and 44 of the answer sheet. In the group 61 the two end photo detectors 28 are shown with the intermediate three indicated by dotted circles. The photo detectors used are preferably light responsive silicon controlled rectifiers or photo SCRs which have their cathodes connected through a resistor to a −12 volt supply and with the anodes of all five SCRs 28 in the group connected in parallel to a lead 65. The SCRs 28 each have their signal control electrodes connected to a rheostat 66 and are maintained at a cutoff bias level by means of rheostat adjustment 66. An additional photo SCR 48 which is a light activated relaxation pulse generator is provided to generate sequential signals to control the reset and ensuing logic functions of photo SCRs 28. Bias current to the signal control electrode of the pulse generator SCR 48 controls the light threshold level for triggering and is adjusted by a rheostat 60. The pulse output on line 82 occurs for each light exposure of SCR 48. One advantage of the photo SCR is that it can directly handle the load current and therefore can perform the dual role of light sensing and load actuating. This eliminates the need for intermediate circuits and results in simplification of the overall circuitry.

Essentially the operation of the photo detector 28 requires the presence of anode-cathode voltage and the reception of a light signal sufficient to trigger the device conductive at the threshold level set for the control electrode by biase circuit 66. Once triggered on the SCR 28 conducts and remains conducting even when the light signal is removed until the voltage supply across the cathode-anode path is reduced to approximately zero or reverse voltage. The SCRs remain reset in the absence of light when the anode voltage is restored. This constitutes the reset function which is accomplished by a signal on line 65 for any of the SCRs 28 which are conducting and the signal on line 65 occurs as subsequently explained. When reset occurs a pulse signal appears on output line 68 for each of the SCRs 28 which is reset, and the line 68 is OR gated to a signal input line 69 which drives the two decade counter 71. Counter 71 is provided with reset circuit 72 operated by the carriage (16)-operated reset switch 33.

The operation of the circuit 61, 62, 63 and 64 will thus be clearly understood to provide for switching to conduction SCRs 28 for any corresponding light transmitting apertures appearing in the registered examination paper 18 and answer-aperture plate 22 after the support bed 16 has passed the sensing row made up of lamps 27 and SCRs 28. The number of such conducting SCRs 28 in each row is recorded as the support bed 16 moves to a position to trigger the SCR 48 by light passing through the apertures 47 to generate a sequential set of signals on lines 65. These sequential signals effectively reduce the anode-cathode voltage across the SCRs 28 to zero or reverse voltage by circuit 67 thereby resetting any SCRs which are conducting and supplying the total number of such reset SCR signals to be accumulated in the counter 71.

The signals supplied on line 65 are derived as follows. Each line 65 is the output from one side of a set of flip flops 73, 74, 75 and 76 which are connected as a shift register responsive to a clock signal on line 77 and a signal derived from the preceding stage with flip flop 73 driven by flip flop 78. The flip flop 78 is set by the pulse on line 79 from a Schmitt trigger 81. The input signal from the Schmitt trigger 81 is a pulse on line 82 which is derived or generated from the SCR 48 which reads the centrally located rectangular hole light signals from apertures 47. The clock signal on line 77 is derived from a free running multivibrator 83 which operates at a suitable clock frequency such as 20,000 cycles per second.

The operation of the circuit of FIG. 6 when an examination paper is being graded and the accumulated score indicated is as follows. The clock oscillator 83 provides a square wave signal on line 77 which is applied to all of the flip flops 73–76 and 78. Whenever a rectangular pulse generator aperture 47 passes over the central SCR 48 the light reaching SCR 48 renders it temporarily conductive thereby generating a pulse on line 82 which is shaped in the Schmitt trigger 81 to produce a signal on line 79 which sets flip flop 78. On the next succeeding clock signal on line 77 an output on line 84 sets flip flop 73 thereby producing a signal on line 65 which resets the SCR 28 in the group 61 to accumulate a count to the decade counter 71 if any of these SCRs 28 had been rendered conductive by a light signal passing to the SCRs through the aligned apertures from a row of holes 46 on the examination paper. If the examination paper has been correctly marked for the four questions represented by a particular row no light signals will reach the SCRs 28 in any of the groups 61, 62, 63 or 64 and no count will be passed to the decade counter 71. For any incorrect or omitted answer one of the SCRs 28 in one of the four groups will be energized and as many such incorrect or unused answers as exist in a given row will be sequentially reflected as counts on line 69 and accumulated in the register 71. With the next clock pulse on line 77 the flip flop 73 is reset and the enabled condition of the flip flop 73 permits that same clock pulse to set the flip flop 74. Thus the sequence has proceeded to read the SCR 28 in the group 62 to accumulate the number of incorrect and unused answers to the counter 71. The sequence proceeds on the next two subsequent clock pulses on line 77 to set and reset the flip flops 75 and 76 in turn thereby accumulating sequentially all of the incorrect and unused answers in a row as represented by conducting SCRs 28 in the four groups of five flip flops each in the sensor row of the machine. This process is repeated row by row as light repeatedly reaches and energizes the pulse generating photo SCR 48 through the central rectangular apertures 47. Thus for each row the light energized pulse generating photo SCR 48 produces a trigger pulse on line 79 which will set flip flop 78 to actuate the scanning and resetting of the photo detector SCRs 28 and thereby placing any resulting accumulating total in the counting register 71.

As will be apparent the accumulation in register 71 is of the number of incorrect and unused answers and accordingly to represent the examination paper score for 100 questions the count that is accumulated will be the complement of 100, i.e., a substractive count of the incorrect and omitted answers from 100 will produce an indication on the front panel indicator 13 of the correct score as the number of questions answered correctly. Also when less than 100 questions are used the unused answers are disregarded from the total count.

The extremely simple arrangement for examination grading shown provides high reliability and accuracy with the line by line photo sensing of a plurality of answers in the columns of the examination paper where each light transmission aperture is permitted to sense the necessary light signal from the lamps 27 as the row of combined photo detector apertures 46 and 49 passes the sensor row. As the combined apertures 46 and 49 pass over the sensor row each individual photo SCR 28 will await the necessary light level required to trigger and latch it on as set by the threshold adjustment rheostat 66 without regard to any special alignment, timing or occurence sequence. The row count is now temporarily stored in the photo SCRs 28 and will be accumulated into the counting register 71 during the photo SCR scanning and resetting cycle. This scanning and resetting cycle occurs by means of rectangular apertures 47 which in the vertical direction are positioned approximately midway between successive horizontal rows of approximately square apertures 49. This midway position of the rectangular apertures 47 in relation to the horizontal rows of approximately square apertures 48 makes sure that photo SCRs 28 are in a dark area during the scanning and resetting cycle and do not have sufficient light above threshold striking them to interfere with proper reset. Therefore reset will take place. That is to say that after the row of answers has been detected and temporarily stored in a photo SCR 28 by rendering one of each group of five photo SCRs 28 conductive, the scanning provided by the shift register flip flops 73-76 sequentially reads the score for a particular row while simultaneously resetting the photo SCRs and registers the result. This method of obtaining a signal generated by the photo detectors as they independently reach light threshold and temporarily storing this signal after each row is sensed before further processing this signal eliminates timing and alignment problems and permits the use of simplified and relatively slow electronic logic throughout the entire system.

Thus the optical effects of misalignment of the apertures is minimized by the geometry of the light transmissive apertures 46 and 49 while maintaining a small response mark of a preferred relatively long and narrow shape and pulse synchronization is not a problem because the traverse of the examination paper page row-by-row stores the answer information for each row prior to and until its readout thereby assuring a systematic accumulation of the total. Also, the speed of the clock pulses on line 77 can be relatively slow and yet assure a complete scan and reset of the four columns during the darkness interval while passing from one row to the next row during a normal manual traverse at the rate at which the support bed 16 is manually withdrawn from the device by pulling on handle 23. Thus a large number of papers can be graded by an individual teacher with relatively simple equipment and with complete reliability as to the result.

Although test answer sheet scanning by manually moving the slide has been disclosed this motion can be motorized or otherwise done mechanically. Also, although a visual readout of the test score on electronic indicator tubes mounted on the front panel has been disclosed other means of presenting the text score may be used such as permanent printing on the test sheet or printing on an auxiliary tape of an off-line printer. Other modifications can be made by those skilled in the art without departing from the scope of the invention as defined in the appended claims.

I claim:

1. For use in photo-transmissive electronic machine scoring of multiple-choice type examination papers, the combination comprising a light transmissive type test answer response sheet and an aperture device having:

a. a test answer response sheet having thereon in regular row and column array a plurality of rows of multiple-choice answer response blocks and at least one column of said multiple-choice answer response blocks, each said answer response block comprising of an opaque rectangle containing therein a plurality of spaced and aligned rectangular light transmissive areas which can be rendered opaque by a mark applied by a student; and b. an aperture device to be used with the test answer response sheet during scoring comprised of an opaque surface with a pattern of rectangular light transmissive areas that are adapted to register and cooperate with correspondingly located said light transmissive areas of said test answer response sheet;

with each rectangular light transmissive area of said test answer response sheet and each rectangular light transmissive area of said aperture device being defined at their design center positions when used together in the scoring machine such that each rectangular light transmissive area of the said test answer response sheet having a width greater than the width of the correspondingly located rectangular light transmissive area of the said aperture device in one coordinate dimension by an amount of overlap on each side that is substantially equal to or greater than the expected maximum overall misalignment from the said design center position during actual use and a width less than the width of the correspondingly located rectangular light transmissive area of the said aperture device in the orthogonal coordinate dimension by an amount of overlap on each side that is substantially equal to or greater than the expected maximum overall misalignment from the said design center position during actual use to provide relatively large and constant area resultant apertures that are substantially without size or positional alignment errors due to manufacturing tolerance accumulation and assembly misalignment and permits closer adjacent aperture spacing by minimizing light energy interference to each photo-detector from adjacent aperture positions.

* * * * *